United States Patent
Hattori et al.

(10) Patent No.: US 7,733,565 B2
(45) Date of Patent: Jun. 8, 2010

(54) LASER MICROSCOPE

(75) Inventors: Toshiyuki Hattori, Tokyo (JP); Hiroshi Sasaki, Tokyo (JP)

(73) Assignee: Olympus Corporation, Tokyo (JP)

(*) Notice: Subject to any disclaimer, the term of this patent is extended or adjusted under 35 U.S.C. 154(b) by 137 days.

(21) Appl. No.: 12/069,520

(22) Filed: Feb. 11, 2008

(65) Prior Publication Data

US 2008/0198449 A1 Aug. 21, 2008

(30) Foreign Application Priority Data

Feb. 19, 2007 (JP) ............................. 2007-037831

(51) Int. Cl.
*G02B 21/06* (2006.01)
*G02B 21/00* (2006.01)

(52) U.S. Cl. ....................... 359/385; 359/368

(58) Field of Classification Search .......... 359/368–390
See application file for complete search history.

(56) References Cited

U.S. PATENT DOCUMENTS

| 6,094,300 | A | 7/2000 | Kashima et al. | |
| 7,196,843 | B2* | 3/2007 | Nakata | 359/385 |
| 7,223,986 | B2* | 5/2007 | Natori | 250/458.1 |
| 2001/0022341 | A1 | 9/2001 | Adachi et al. | |
| 2005/0263690 | A1 | 12/2005 | Araya et al. | |

FOREIGN PATENT DOCUMENTS

JP 10-206742 A 8/1998

OTHER PUBLICATIONS

European Patent Office Extended Search Report dated May 26, 2008, issued in counterpart European Patent Application No. 08002548.9.

* cited by examiner

*Primary Examiner*—Thong Nguyen
(74) *Attorney, Agent, or Firm*—Frishauf, Holtz, Goodman & Chick, P.C.

(57) ABSTRACT

It is possible to change a focal position or spot diameter of an optical stimulation laser beam without causing any misalignment of the optical axis, thus precisely applying optical stimulation to a desired position or region on a specimen. The invention provides a laser microscope comprising an observation light path for guiding an observation laser beam; an optical stimulation light path for guiding an optical stimulation laser beam; and a light-path combining unit for combining these light paths; and the laser microscope also comprises, in at least the optical stimulation light path, a focal-position adjusting unit for adjusting a focal position of the laser beam; an optical-axis misalignment detector for detecting an amount of misalignment of an optical axis between the focal-position adjusting unit and the light-path combining unit; and an alignment unit for adjusting an optical axis position on the basis of the amount of misalignment of the optical axis detected by the optical-axis misalignment detector.

13 Claims, 2 Drawing Sheets

LASER MICROSCOPE

BACKGROUND OF THE INVENTION

1. Field of the Invention

The present invention relates to a laser microscope.

This application is based on Japanese Patent Application No. 2007-037831, the content of which is incorporated herein by reference.

2. Description of Related Art

A known microscope in the related art is provided with an optical stimulation light path for guiding an optical stimulation laser beam and a separate observation light path for guiding an observation laser beam (for example, see Japanese Unexamined Patent Application, Publication No. HEI10-206742).

In this laser microscope, because optical stimulation is applied to a sectional plane in the specimen different from the observed sectional plane, it is possible to change the focal position of the optical stimulation laser beam in the specimen.

However, when the focal position of the optical stimulation laser beam is changed by moving a lens located in the light path, the center position of the lens shifts and the lens tilts due to errors in the driving system. In such an event, it is not possible to precisely apply the optical stimulation to a desired position because the optical axis of the laser beam misaligns, with the result that it is not possible to acquire the desired observation results.

In addition, when the spot diameter of the laser beam for performing optical stimulation is to be adjusted, there is some movement of the lens located in the path of the optical stimulation laser beam, and a similar problem also occurs in this case.

BRIEF SUMMARY OF THE INVENTION

The present invention provides a laser microscope which can change the focal position and spot diameter of an optical stimulation laser beam without causing any misalignment of the optical axis and which can precisely apply optical stimulation to a desired position or region on the specimen.

A first aspect of the present invention is a laser microscope including an observation light path for guiding an observation laser beam; an optical stimulation light path for guiding an optical stimulation laser beam; and a light-path combining unit configured to combine these light paths; in which the laser microscope further includes, in at least the optical stimulation light path, a focal-position adjusting unit configured to adjust a focal position of the laser beam; an optical-axis misalignment detector configured to detect an amount of misalignment of an optical axis between the focal-position adjusting unit and the light-path combining unit; and an alignment unit configured to adjust an optical axis position on the basis of the amount of misalignment of the optical axis detected by the optical-axis misalignment detector.

According to the first aspect of the present invention, the observation laser beam guided via the observation light path and the optical stimulation laser beam guided via the optical stimulation light path are combined by the light-path combining unit and irradiate the specimen. The focal position of the optical stimulation laser beam is changed by operating the focal-position adjusting unit disposed in the optical stimulation light path, and when an optical-axis misalignment occurs between the focal-position adjusting unit and the light-path combining unit according to that change, that misalignment is detected by operating the optical-axis misalignment detector. In that case, because the optical-axis position is adjusted by operating the alignment unit on the basis of the detected amount of misalignment to correct the misalignment, it is possible to change the focal position without causing any optical-axis misalignment in the optical stimulation laser beam. In other words, even when the focal position of the optical stimulation laser beam moves in the optical-axis direction, the focal position does not move in a direction intersecting the optical axis. Therefore, it is possible to apply optical stimulation to a desired position on the specimen, and it is possible to perform observation with the observation laser beam.

A second aspect of the present invention is a laser microscope including an observation light path for guiding an observation laser beam; an optical stimulation light path for guiding an optical stimulation laser beam; and a light-path combining unit configured to combine these light paths; in which the laser microscope further includes, in at least the optical stimulation light path, a spot-diameter adjusting unit for adjusting a spot diameter of the laser beam; an optical-axis misalignment detector configured to detect an amount of misalignment of an optical axis between the spot-diameter adjusting unit and the light-path combining unit; and an alignment unit configured to adjust an optical axis position on the basis of the amount of misalignment of the optical axis detected by the optical-axis misalignment detector.

According to the second aspect of the present invention, the spot diameter of the optical stimulation laser beam is changed by operating the spot-diameter adjusting unit disposed in the optical stimulation light path, and when an optical axis misalignment occurs between the spot-diameter adjusting unit and the light-path combining unit according to that change, the amount of misalignment is detected by operating the optical-axis misalignment detector. In that case, because the optical-axis position is adjusted by operating the alignment unit on the basis of the detected amount of misalignment to correct the misalignment, it is possible to change the spot diameter without causing any optical-axis misalignment of the optical stimulation laser beam. In other words, even when the spot diameter of the optical stimulation laser beam is reduced or increased, the irradiation region of the laser beam does not shift in a direction intersecting the optical axis. Therefore, it is possible to apply optical stimulation to a desired region on the specimen, and it is possible to perform observation with the observation laser beam.

A third aspect of the present invention is a laser microscope including an observation light path for guiding an observation laser beam; an optical stimulation light path for guiding an optical stimulation laser beam; and a light-path combining unit configured to combine these light paths; in which the laser microscope further includes, in at least the optical stimulation light path, a focal-position adjusting unit configured to adjust a focal position of the laser beam; a spot-diameter adjusting unit configured to adjust a spot diameter of the laser beam; an optical-axis misalignment detector configured to detect an amount of misalignment of an optical axis between the focal-position adjusting unit and the spot-diameter adjusting unit, and the light-path combining unit; and an alignment unit configured to adjust the optical axis on the basis of the amount of misalignment of the optical axis detected by the optical-axis misalignment detector.

According to the third aspect of the present invention, because the optical-axis position is adjusted by operating the alignment unit on the basis of the detected amount of misalignment to correct the misalignment, it is possible to change the focal position and the spot diameter without causing any optical axis misalignment in the optical stimulation laser beam. In other words, even when the spot diameter of the optical stimulation laser beam is reduced or increased and even when the focal position is moved in the optical-axis direction, the irradiation region of the laser beam does not shift in a direction intersecting the optical axis. Therefore, it is possible to apply optical stimulation to a desired position and region on the specimen, and it is possible to perform observation with the observation laser beam.

In any of the aspects described above, the alignment unit may be disposed on the upstream side of the optical-axis misalignment detector with respect to the laser beam and adjusts an amount of shift and an amount of tilt of the optical axis of the laser beam.

By doing so, shifting and tilting of the optical axis according to the focal position adjustment and the spot diameter adjustment can be corrected by the alignment unit, and the optical stimulation can be applied to a desired position on the specimen with superior precision.

In any of the aspects described above, laser light sources configured to emit the laser beams and scanners configured to two-dimensionally scan the laser beams emitted from the laser light sources may be provided in the observation light path and in the optical stimulation light path.

By doing so, a different type of laser light can be emitted from the laser light source provided in each light path, and it is possible to independently adjust the scanning region and irradiation position scanned by the separate scanners.

In the configuration described above, the laser light sources may be wavelength-tunable ultrashort pulsed laser light sources.

By doing so, using the optical-axis misalignment detector, it is also possible to detect movement of the optical axis caused by a change in wavelength of the laser light emitted from the ultrashort-pulsed laser light source, and it is possible to correct it with the alignment unit.

In any of the aspects described above, the focal-position adjusting unit may be formed of a wavefront converting element.

By doing so, it is possible to convert the wavefront of the laser beam by operating the wavefront converting element, to move the focal position of the optical stimulation laser beam in the optical-axis direction.

In the configuration in which the laser light sources and the scanners are provided in the observation light path and the optical stimulation light path, as described above, the alignment unit may change the scanning range of the scanner.

By doing so, it is possible to easily correct the optical axis misalignment using a scanner that two-dimensionally scans the laser beam on the specimen.

According to the present invention, it is possible to change the focal position or spot diameter of an optical stimulation laser beam without causing any misalignment of the optical axis, thus affording an advantage in that it is possible to apply optical stimulation to a desired position or region of the specimen with superior precision.

DETAILED DESCRIPTION OF THE INVENTION

A laser microscope 1 according to an embodiment of the present invention will be described below with reference to FIG. 1.

Figure 1:
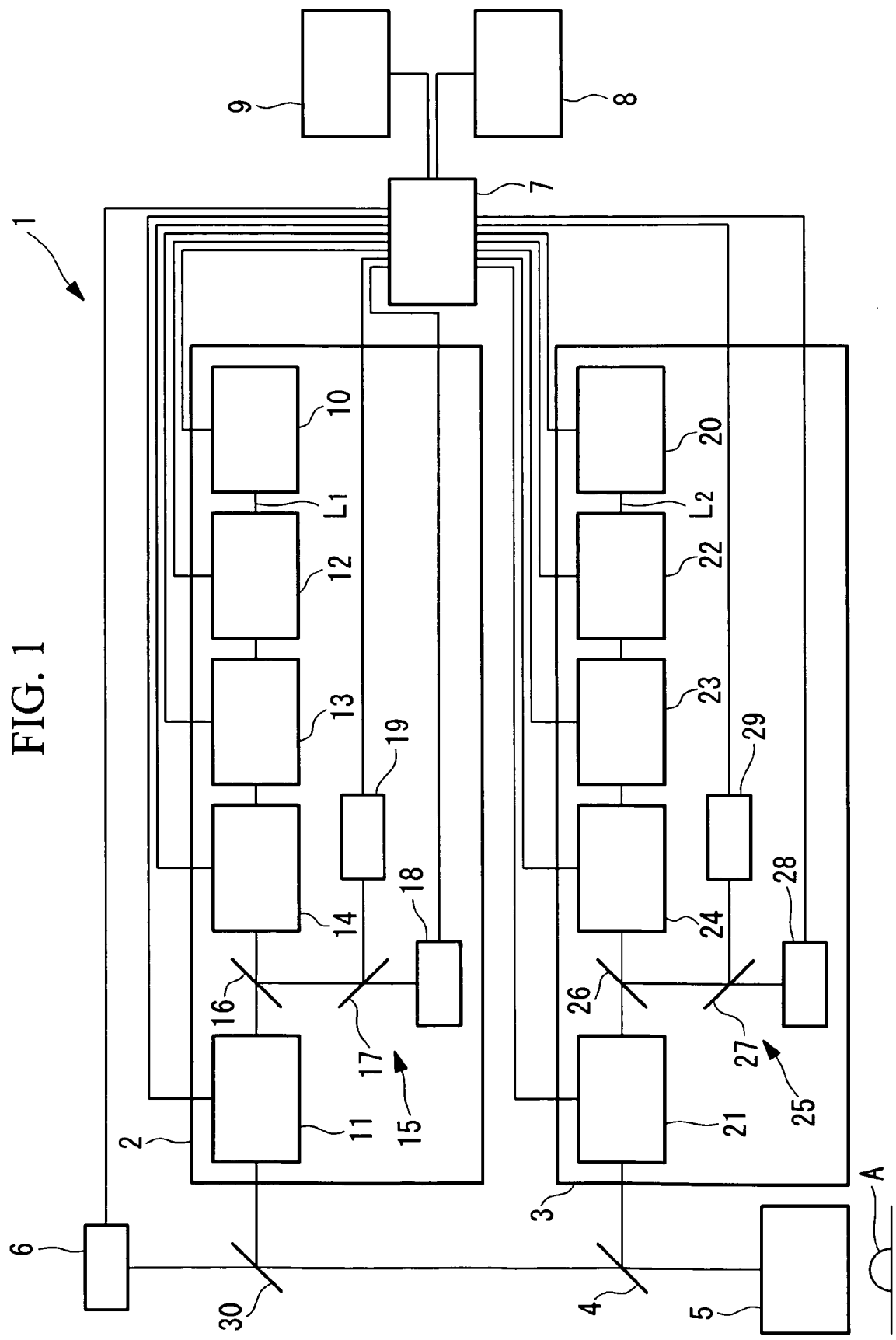
FIG. 1 is a block diagram showing the overall configuration of a laser microscope according to an embodiment of the present invention.

As shown in FIG. 1, the laser microscope 1 according to this embodiment includes an observation optical system 2 for emitting laser light for observing a specimen A; an optical stimulation optical system 3 for emitting laser light for applying optical stimulation to the specimen A; a dichroic mirror (light-path combining unit) 4 for combining the laser light from these optical systems 2 and 3; an objective lens 5 for irradiating the specimen A with the laser light combined by the dichroic mirror 4 and for collecting light returning from the specimen A; a light detector 6 for detecting the light collected by the objective lens 5; a control unit 7 for controlling these components; a display unit 8 for displaying the detected light; and an input unit 9 for the operator to input operations.

The observation optical system 2 includes a laser light source 10 for emitting a laser beam $L_1$, such as ultrashort pulsed laser light, and a scanner 11 for two-dimensionally scanning the laser beam $L_1$ emitted from the laser light source 10. In addition, between the laser light source 10 and the scanner 11, the observation optical system 2 is provided with a spot-diameter adjusting unit 12 for adjusting the spot diameter of the laser beam $L_1$ emitted from the laser light source 10; a focal-position adjusting unit 13 for adjusting the focal position at the front of the objective lens 5; an optical-axis aligning unit (alignment unit) 14 for adjusting the shift and tilt of the optical axis of the laser beam $L_1$; and an optical-axis misalignment detector 15 for detecting any misalignment of the optical axis of the laser beam $L_1$.

The spot-diameter adjusting unit 12 is formed of, for example, a beam expander.

The beam expander adjusts the spot diameter of the laser beam irradiating the specimen A by changing the beam diameter of the laser beam incident on a pupil of the objective lens 5.

The focal-position adjusting unit 13 is formed of one or more lenses which can be moved in a direction parallel to the optical axis. The focal-position adjusting unit 13 may be formed of a wavefront converting element.

The optical-axis aligning unit 14 is formed of a beam shifter provided with two flat mirrors which can be rotated about two respective axes thereof.

The optical-axis misalignment detector 15 is disposed in the observation light path of the observation optical system 2 and includes a first beamsplitter 16 for splitting off part of the laser beam $L_1$, a second beamsplitter 17 for further splitting the laser beam $L_1$ split off by the first beamsplitter 16 into two beams, and two photodetectors (sensors) 18 and 19 for detecting the laser beam $L_1$ split by the second beamsplitter 17.

The two photodetectors 18 and 19 detect the spot positions of the incident laser beam $L_1$. In addition, the two photodetectors 18 and 19 are disposed at different distances from the second beamsplitter 17. Therefore, it is possible to detect the tilt of the observation laser beam $L_1$ on the basis of the difference in spot positions of the laser beam $L_1$ detected by the two photodetectors 18 and 19.

The optical stimulation optical system 3 includes a laser light source 20 for emitting a laser beam $L_2$, such as ultrashort pulsed laser light, and a scanner 21 for two-dimensionally moving the spot position of the laser beam $L_2$ emitted from the laser light source 20. In addition, between the laser light source 20 and the scanner 21, the optical stimulation optical system 3 is also provided with a spot-diameter adjusting unit 22 for adjusting the spot diameter of the laser beam $L_2$ emitted from the laser light source 20; a focal-position adjusting unit 23 for adjusting the focal position at the front of the objective lens 5; an optical-axis aligning unit 24 for adjusting the shift and tilt of the optical axis of the laser beam $L_2$; and an optical-axis misalignment detector 25 for detecting any misalignment of the optical axis of the laser beam $L_2$.

The spot-diameter adjusting unit 22, the focal-position adjusting unit 23, and the optical-axis aligning unit 24 in the optical stimulation optical system 3 are the same as those in the observation optical system 2. The optical-axis misalignment detector 25 is disposed in the light path of the optical stimulation optical system 3 and includes a first beamsplitter 26 for splitting off part of the laser beam $L_2$, a second beamsplitter 27 for further splitting the laser beam $L_2$ split off by the first beamsplitter 26 into two beams; and two photodetectors (sensors) 28 and 29 for detecting the positions of the laser beam $L_2$ split by the second beamsplitter 27.

The control unit 7 receives the operator's operations input via the input unit 9, for example, operation inputs for changing the spot diameter or operation inputs for changing the focal position, and outputs adjustment commands to the spot-diameter adjusting units 12 and 22 or the focal-position adjusting units 13 and 23. In addition, the control unit 7 adjusts the optical-axis aligning units 14 and 24 on the basis of the optical axis shift and tilt detected by operating the optical-axis misalignment detectors 15 and 25. Reference numeral 30 in the drawing is a dichroic mirror.

The operation of the laser microscope 1 according to this embodiment, configured in this way, will be described below.

To observe the specimen A using the laser microscope 1 according to this embodiment, the laser beam $L_1$ emitted from the laser light source 10 is two-dimensionally scanned by operating the scanner 11 and irradiates the specimen A via the objective lens 5. When the laser beam $L_1$ is radiated, a fluorescent substance present in the specimen A at the focal position thereof is excited, generating multiphoton fluorescence. The generated multiphoton fluorescence is collected by the objective lens 5 and is detected by the light detector 6.

A multiphoton fluorescence image is created by the control unit 7 by storing the detected multiphoton fluorescence in a format where the intensity thereof is associated with the scanning position of the scanner 11. Then, the multiphoton-fluorescence image obtained is displayed by the display unit 8, thus allowing the operator to perform multiphoton fluorescence observation of the specimen A.

With the laser microscope 1 according to this embodiment, by operating the optical stimulation optical system 3, the spot of the laser beam $L_2$ emitted from the laser light source 20 is two-dimensionally adjusted in position by the scanner 21 and irradiates the specimen A via the objective lens 5. Accordingly, it is possible to perform fluorescence observation of the specimen A by simultaneously using the observation optical system 2 while applying optical stimulation to a specific position on the specimen A.

When the operator wishes to change the spot diameter of the observation laser beam $L_1$ or the optical stimulation laser beam $L_2$, or when he or she wishes to change the focal position at the tip of the objective lens 5, he or she inputs an operation therefor via the input unit 9.

When an operation for changing the spot diameter is input, the control unit 7 outputs command signals to the spot-diameter adjusting units 12 and 22 in accordance with that input. Also, when an operation for changing the focal position is input, the control unit 7 outputs command signals to the focal-position adjusting units 13 and 23 in accordance with that input.

Because the spot-diameter adjusting units 12 and 22 are formed, for example, of beam expanders, the optical axes of the laser beams $L_1$ and $L_2$ may shift in directions intersecting the optical axes according to the change in spot diameter due to shape errors in lenses constituting the beam expanders or mechanical errors in lens moving mechanisms, or the tilts thereof may change. In addition, because the focal-position adjusting units 13 and 23 are formed of one or more lenses which move in the optical-axis direction, the optical axes of the laser beams $L_1$ and $L_2$ shift or tilt according to the change in focal position, due to lens shape errors or mechanical errors in the lens moving mechanisms.

With the laser microscope 1 according to this embodiment, because the optical-axis misalignment detectors 15 and 25 are provided, parts of the laser beams $L_1$ and $L_2$ emitted from the laser light sources 10 and 20 are split off by the first beamsplitters 16 and 26, are then further split into two by the second beamsplitters 17 and 27, and are detected by the corresponding photodetectors 18 and 19 and the photodetectors 28 and 29. The shift amounts of the laser beams $L_1$ and $L_2$ are detected on the basis of the detected positions of the spots of the laser beams $L_1$ and $L_2$ at the two photodetectors 18 and 19 and at the two photodetectors 28 and 29. Because the distances from the second beamsplitters 17 and 27 to the two photodetectors 18 and 19 and the two photodetectors 28 and 29 are different, the tilts of the laser beams $L_1$ and $L_2$ are detected on the basis of the difference in detected spot positions on the two photodetectors 18 and 19 and the two photodetectors 28 and 29.

When the shifts of the optical axes of the laser beams $L_1$ and $L_2$ are detected by the two photodetectors 18 and 19 and the two photodetectors 28 and 29, the control unit 7 outputs to the optical-axis aligning units 14 and 24 command signals for shifting the optical axes in directions opposite to the directions of the detected shifts; thus, the shifts are corrected by operating the optical-axis aligning units 14 and 24. When the tilts of the optical axes of the laser beams $L_1$ and $L_2$ are detected, the control unit 7 outputs to the optical-axis aligning units 14 and 24 command signals for tilting the optical axes in directions opposite to the detected tilts; thus, the tilts are corrected by operating the optical-axis aligning units 14 and 24.

With the laser microscope 1 according to this embodiment, while two-dimensionally scanning the observation laser beam $L_1$ emitted from the observation optical system 2 on the specimen A and performing multiphoton fluorescence observation of the specimen A, when the position in the optical axis direction or the spot diameter for performing optical stimulation with the optical stimulation laser beam $L_2$ emitted from the optical stimulation optical system 3 changes, it is possible to perform correction so that no optical-axis misalignment occurs even when the focal position or spot diameter changes.

With the laser microscope 1 according to this embodiment, when specifying the optical stimulation position on the basis of an image of the specimen acquired by irradiating it with the observation laser beam $L_1$, it is always possible to correctly apply the optical stimulation to a specified position on the image.

In this embodiment, the optical-axis misalignment detectors 15 and 25 and the optical-axis aligning units 14 and 24 are provided in the observation optical system 2 and the optical stimulation optical system 3. However, the optical-axis aligning units 14 and 24 may be provided in just one optical system, for example, only in the optical stimulation optical system 3.

In this case, the optical-axis unit 24 is controlled by the control unit 7 so that the irradiation position of the optical stimulation laser beam $L_2$ is coincident with the irradiation position of the observation laser beam $L_1$, on the basis of the amounts of optical axis misalignment detected by the optical-axis misalignment detectors 15 and 25. Thus, when specifying an optical stimulation position on the basis of the image acquired by irradiating the specimen with the observation laser beam $L_1$, it is always possible to correctly perform optical stimulation of a specified position on the image.

Figure 2:
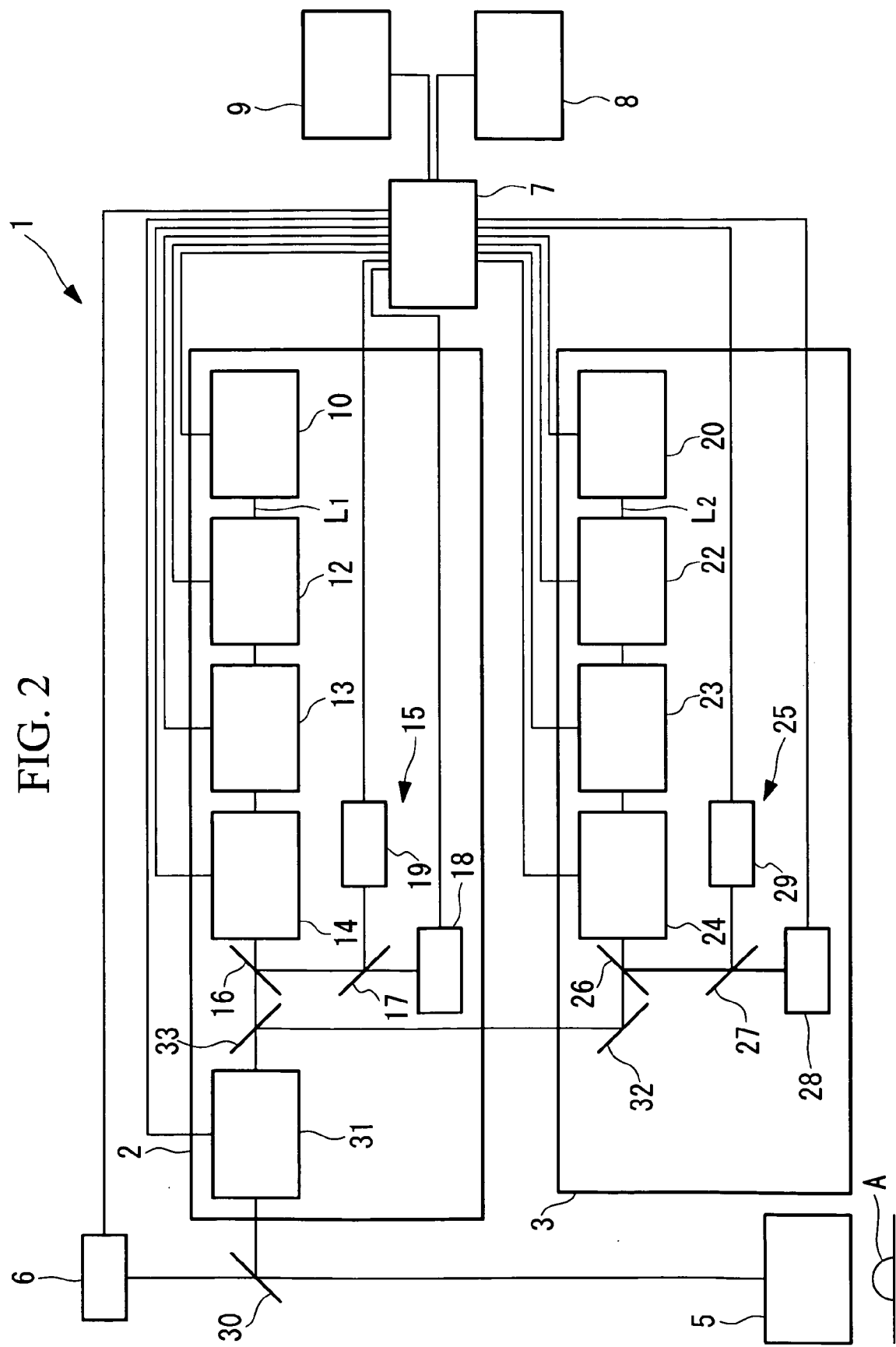
FIG. 2 is a diagram showing a modification of the laser microscope in FIG. 1.

In this embodiment, the scanners 11 and 21 are provided in the observation optical system 2 and the optical stimulation optical system 3, and simultaneous acquisition of multiphoton fluorescence images is independently performed while applying optical stimulation to a prescribed position on the specimen A. Instead of this, however, as shown in FIG. 2, a common scanner 31 may be used in the observation optical system 2 and the optical stimulation optical system 3. Reference numeral 32 in the drawing is a mirror, and reference numeral 33 is a dichroic mirror.

In this case, because it is not possible to perform both multiphoton fluorescence observation and optical stimulation independently, they should be performed in a time-division manner.

In this embodiment, the optical-axis aligning units 14 and 24 are provided separately from the scanners 11 and 21. Instead of this, however, shift or tilt correction of the optical axes may be performed by the scanners 11 and 21 according to the detection results obtained by the optical-axis misalignment detectors 15 and 25. In other words, the scanning range of the scanners 11 and 21 may be moved from the standard position so as to compensate for the irradiation position misalignment of the laser beam on the specimen A, the irradiation position misalignment which occurs in response to the optical-axis misalignment. This control is performed by the control unit 7. By doing so, it is possible to quickly perform correction of the optical-axis misalignment.

The laser light sources 10 and 20 employed emit the ultrashort pulsed laser beams $L_1$ and $L_2$. Instead of this, however, light sources that emit continuous laser light may be employed. In this case, the fluorescence should be split off by a dichroic mirror (not shown in the drawings) located between the scanner 11 and the beamsplitter 16 and detected by the light detector 6 via a confocal pinhole (not shown in the drawings).

In this embodiment, because misalignment of the optical axes is also caused by changing the wavelength of the ultrashort pulsed laser beams emitted from the laser light sources 10 and 20, the control unit 7 can also correct optical axis misalignment when the wavelength is changed.

What is claimed is:

1. A laser microscope comprising:
   an observation light path for guiding an observation laser beam;
   an optical stimulation light path for guiding an optical stimulation laser beam; and
   a light-path combining unit configured to combine said light paths;
   wherein the laser microscope further comprises, in at least the optical stimulation light path:
   at least one of a focal-position adjusting unit configured to adjust a focal position of the laser beam and a spot-diameter adjusting unit configured to adjust a spot diameter of the laser beam;
   an optical-axis misalignment detector configured to detect an amount of misalignment of an optical axis between at least one of the focal-position adjusting unit and the spot-diameter adjusting unit, and the light-path combining unit; and
   an alignment unit configured to adjust the optical axis so that irradiation positions of the observation laser beam and the optical stimulation laser beam are not relatively shifted on a plane perpendicular to the optical axis on a specimen, based on the amount of misalignment of the optical axis detected by the optical-axis misalignment detector.

2. A laser microscope according to claim 1, wherein the alignment unit is disposed on an upstream side of the optical-axis misalignment detector with respect to the laser beam and adjusts an amount of shift and an amount of tilt of the optical axis of the laser beam.

3. A laser microscope according to claim 1, wherein the laser microscope further comprises a laser light source configured to emit the laser beam and a scanner configured to two-dimensionally scan the laser beam emitted from the laser light source provided in the observation light path and in the optical stimulation light path.

4. A laser microscope according to claim 3, wherein the laser light source comprises a wavelength-tunable ultrashort pulsed laser light source.

5. A laser microscope according to claim 3, wherein the alignment unit is configured to perform control to change a scanning range of the scanner so as to compensate for a shift of an irradiation position detected by the optical-axis misalignment detector.

6. A laser microscope according to claim 3, wherein:
   the scanner provided in the observation light path acquires an image of the specimen by scanning the observation laser beam, and
   the scanner provided in the optical stimulation light path adjusts the irradiation position of the optical stimulation laser beam so that the optical stimulation laser beam is radiated in the specified optical stimulation position based on the image of the specimen.

7. A laser microscope according to claim 6, wherein:
   the alignment unit is only provided in one of the observation light path and the optical stimulation light path,
   the optical-axis misalignment detector is provided in each of the observation light path and the optical stimulation light path, and
   the alignment unit adjusts the optical axis so that the irradiation position of the optical stimulation laser beam is coincident with the irradiation position of the observation laser beam based on the amount of misalignment of the optical axis detected by the optical-axis misalignment detector in the observation light path and the amount of misalignment of the optical axis detected by the optical-axis misalignment detector in the optical stimulation light path.

8. A laser microscope according to claim 1, wherein the focal-position adjusting unit comprises a wavefront converting element.

9. A laser microscope according to claim 1, further comprising:
   an input unit configured to input an operation for changing at least one of the spot diameter and the focal position; and
   a control unit configured to output corresponding command signals to at least one of the spot-diameter adjusting unit and the focal-position adjusting unit in accordance with the input of the operation for changing;

wherein the alignment unit adjusts the optical axis based on the amount of misalignment of the optical axis detected by the optical-axis misalignment detector, when at least one of the spot diameter and the focal position of the laser beam is changed.

10. A laser microscope according to claim 9, further comprising, in the observation light path:
   at least one of a focal-position adjusting unit configured to adjust a focal position of the observation laser beam and a spot-diameter adjusting unit configured to adjust a spot diameter of the observation laser beam;
   an optical-axis misalignment detector configured to detect an amount of misalignment of an optical axis between at least one of the focal-position adjusting unit and the spot-diameter adjusting unit, and the light-path combining unit; and
   an alignment unit configured to adjust the optical axis based on the amount of misalignment of the optical axis detected by the optical-axis misalignment detector;
   wherein the control unit adjusts each optical axis by the optical-axis misalignment detector and the alignment unit in the observation light path, and the optical-axis misalignment detector and the alignment unit in the optical stimulation light path, when the operation for changing is input to the input unit.

11. A laser microscope according to claim 10, wherein the alignment unit is configured to perform control to change a scanning range of the scanner so as to compensate for a shift of an irradiation position detected by the optical-axis misalignment detector.

12. A laser microscope according to claim 1, wherein:
   the alignment unit is provided in one of the observation light path and the optical stimulation light path,
   the optical-axis misalignment detector is provided in each of the observation light path and the optical stimulation light path, and
   the alignment unit adjusts the optical axis so that the irradiation position of the optical stimulation laser beam is coincident with the irradiation position of the observation laser beam based on the amount of misalignment of the optical axis detected by the optical-axis misalignment detector in the observation light path and the amount of misalignment of the optical axis detected by the optical-axis misalignment detector in the optical stimulation light path.

13. A laser microscope according to claim 1, wherein the laser microscope further comprises a laser light source configured to emit the laser beam and a scanner configured to two-dimensionally scan the laser beam emitted from the laser light source provided in at least one of the observation light path and the optical stimulation light path.

* * * * *